Patented May 1, 1934

1,956,889

UNITED STATES PATENT OFFICE 1,956,889

SALTS OF DIALKYLAMINOARYLPHOSPHINOUS ACIDS AND PROCESS OF MAKING THEM

Louis Benda, Frankfort-on-the-Main, Germany, assignor to Winthrop Chemical Company, Inc., New York, N. Y., a corporation of New York No Drawing. Application June 3, 1933, Serial No. 674,259. In Germany July 24, 1931

12 Claims. (Cl. 260—128)

The present invention relates to a process of preparing salts of dialkylaminoarylphosphinous acids.

The salts of dialkylaminoarylphosphinous acids, which are described, for instance, in U. S. Patent No. 1,607,113, dated November 16, 1926, filed in the name of Louis Benda and Werner Schmidt, have valuable therapeutic properties. They are, however, not stable in a solid state, but after being stored for a short time they show signs of decomposition already at ordinary temperature and they assume a disagreeable odor and taste. Therefore, they could hitherto not be administered orally.

Now I have found that completely stable products, which do not decompose at an elevated temperature, are obtained by heating in an open vessel crystallized salts of the following formula

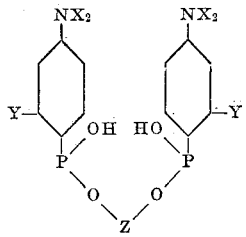

wherein X stands for an alkyl radical, Y for hydrogen or a substituent of the group consisting of alkyl, alkoxy and dialkylamino, and Z for an alkaline earth metal.

This operation is preferably carried out at a temperature between about 70° C. and about 120° C. The salts may be heated under a reduced pressure. The duration of heating depends upon the degree of temperature and the pressure. It varies between about 2 hours and about 4 days. The heating operation is preferably continued until the weight of the substance heated remains constant.

The following compounds, for instance, may be subjected to the process described:

the calcium salt of 4-dimethylamino-2-methylbenzene-1-phosphinous acid;
the strontium salt of 4-dimethylamino-2-methylbenzene-1-phosphinous acid;
the barium salt of 4-dimethylamino-2-methylbenzene-1-phosphinous acid;
the calcium salt of 4-diethylamino-2-methylbenzene-1-phosphinous acid;
the calcium salt of 4-dimethylamino-2-methoxybenzene-1-phosphinous acid;
the calcium salt of 4-dimethylamino-benzene-1-phosphinous acid;
the calcium salt of 4-dimethylamino-2-ethoxybenzene-1-phosphinous acid;
the calcium salt of 4-dimethylamino-2-dimethylaminobenzene-1-phosphinous acid;
the calcium salt of 4-dimethylamino-2-diethylaminobenzene-1-phosphinous acid;
the calcium salt of 4-dimethylamino-2-ethylbenzene-1-phosphinous acid.

The substances thus obtained may be stored for any time, also in tropics and may be used in the form of a powder or tablets.

The following examples illustrate the invention:

(1) Crystallized calcium salt of 4-dimethylaminobenzene-1-phosphinous acid, as described in U. S. Patent No. 1,607,113, dated November 16, 1926, is heated in a vacuum to 70° C. until no more loss of weight occurs. A powder fine as dust is obtained which is soluble in water, methyl alcohol and ethyl alcohol. The reaction may also be carried out at a temperature between about 100° C. and about 120° C. without applying reduced pressure.

(2) To a cold solution of 82.5 parts of the sodium salt of 4-dimethylamino-2-methylphenyl-1-phosphinous acid in 200 parts of water there is added, while stirring, a cold solution of 120 parts of strontium chloride in 120 parts of water. The mixture is allowed to stand for a prolonged time and then filtered by suction, washed with ice-cold water and dried in the air. The product is boiled with alcohol and filtered with suction. The strontium salt thus obtained is dried in the air at ordinary temperature and then heated in a vacuum to 75° C. The white product obtained is rather readily soluble in water, sparingly soluble in methyl alcohol and ethyl alcohol and almost insoluble in acetone. The air-dry strontium salt contains 2 molecular proportions of crystal-water.

This application is a continuation-in-part of U. S. application Serial No. 623,011, filed July 16, 1932.

I claim:
1. The process which comprises heating a crystallized compound of the following formula:

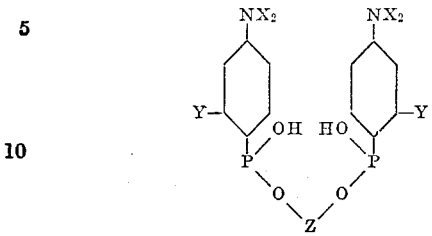

wherein X stands for an alkyl radical, Y for hydrogen or a substituent of the group consisting of alkyl, alkoxy and dialkylamino, and Z for an alkaline earth metal, at a temperature between about 70° C. and about 120° C.

2. The process which comprises heating a crystallized compound of the following formula:

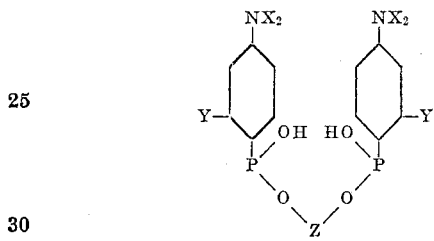

wherein X stands for an alkyl radical, Y for hydrogen or a substituent of the group consisting of alkyl, alkoxy and dialkylamino, and Z for an alkaline earth metal, at a temperature between about 70° C. and about 120° C. under a reduced pressure.

3. The process which comprises heating a crystallized compound of the following formula:

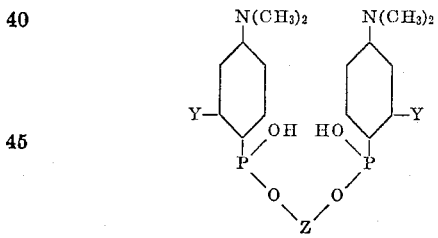

wherein Y stands for hydrogen or a substituent of the group consisting of alkyl, alkoxy and dialkylamino, and Z stands for an alkaline earth metal, at a temperature between about 70° C. and about 120° C.

4. The process which comprises heating a crystallized compound of the following formula:

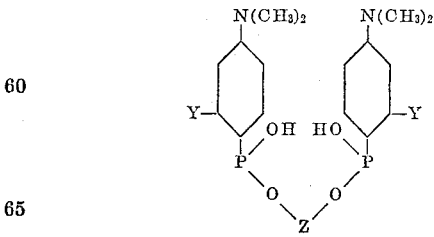

wherein X stands for hydrogen or a substituent of the group consisting of alkyl, alkoxy and dialkylamino, and Z stands for an alkaline earth metal, at a temperature between about 70° C. and about 120° C. under a reduced pressure.

5. The process which comprises heating the crystallized calcium salt of 4-dimethylaminobenzene-1-phosphinous acid at a temperature of about 70° C. under a reduced pressure.

6. The process which comprises heating the crystallized strontium salt of 4-dimethylamino-2-methylbenzene-1-phosphinous acid at a temperature of about 75° C. under a reduced pressure.

7. The products obtainable by heating a crystallized compound of the following formula:

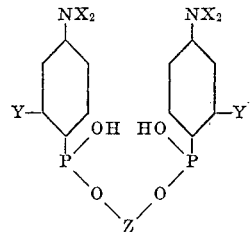

wherein X stands for an alkyl radical, Y for hydrogen or a substituent of the group consisting of alkyl, alkoxy and dialkylamino, and Z for an alkaline earth metal, at a temperature between about 70° C. and about 120° C., said products being colorless stable powders.

8. The products obtainable by heating a crystallized compound of the following formula:

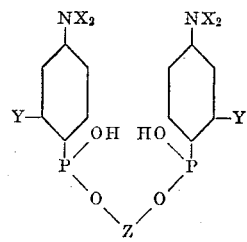

wherein X stands for an alkyl radical, Y for hydrogen or a substituent of the group consisting of alkyl, alkoxy and dialkylamino, and Z for an alkaline earth metal, at a temperature between about 70° C. and about 120° C. under a reduced pressure, said products being colorless stable powders.

9. The products obtainable by heating a crystallized compound of the following formula:

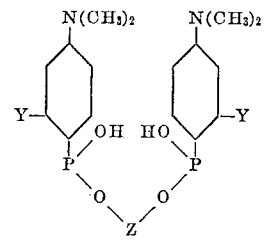

wherein Y stands for hydrogen or a substituent of the group consisting of alkyl, alkoxy and dialkylamino, and Z stands for an alkaline earth metal, at a temperature between about 70° C. and about 120° C., said products being colorless stable powders.

10. The products obtainable by heating a crystallized compound of the following formula:

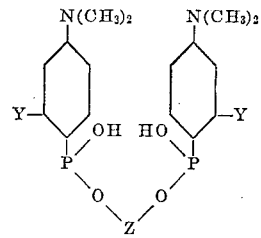

wherein Y stands for hydrogen or a substituent of the group consisting of alkyl, alkoxy and dialkylamino, and Z stands for an alkaline earth metal, at a temperature between about 70° C. and about 120° C. under a reduced pressure, said products being colorless stable powders.

11. The product obtainable by heating the crystallized calcium salt of 4-dimethylaminobenzene-1-phosphinous acid at a temperature of about 70° C. under a reduced pressure, said product being a colorless stable powder.

12. The product obtainable by heating the crystallized strontium salt of 4-dimethylamino-2-methylbenzene-1-phosphinous acid at a temperature of about 75° C. under a reduced pressure, said product being a colorless stable powder.

LOUIS BENDA.